April 4, 1939. J. F. KÖHNKE 2,152,891
PIPE SUPPORT
Filed July 6, 1936 2 Sheets-Sheet 2

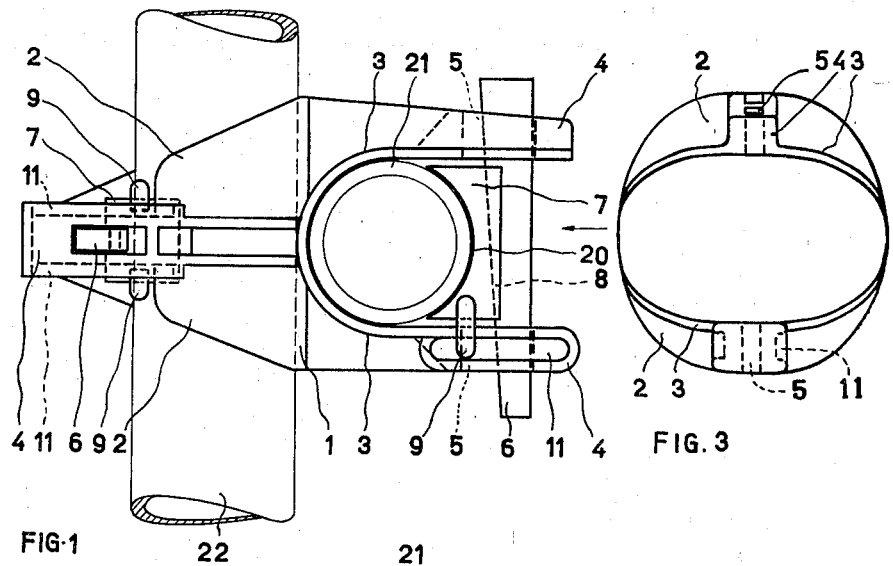

Inventor
Johan Friedrich Köhnke
by Karl Michaelis

Patented Apr. 4, 1939

2,152,891

UNITED STATES PATENT OFFICE 2,152,891

PIPE SUPPORT

Johan Friedrich Köhnke, Haarlem, Netherlands

Application July 6, 1936, Serial No. 89,109
In the Netherlands July 18, 1935

6 Claims. (Cl. 189—36)

My invention relates to pipe supports and more especially to means whereby two juxtaposed or superposed pipes are held and supported in common.

The invention has particular reference to a connecting piece adapted to support two pipes extending at an angle to each other, which as a rule will be a right angle.

It is an object of my invention to provide a device of this kind, which is simple in construction and can readily be mounted in place on the pipes and which combines mechanical strength with great resistivity to wear.

In the drawings affixed to this specification and forming part thereof several devices embodying my invention are illustrated diagrammatically by way of example.

In the drawings

Figs. 1 and 2 are a side elevation and a plan view, respectively, of the first modification, while Fig. 3 is an end view in the direction of the arrow in Fig. 1, in which the pipes are omitted.

Figs. 4 and 5 are a plan view and side elevation, respectively, of a clamping piece adapted for use in connection with the device of Fig. 1.

Figures 6, 7:
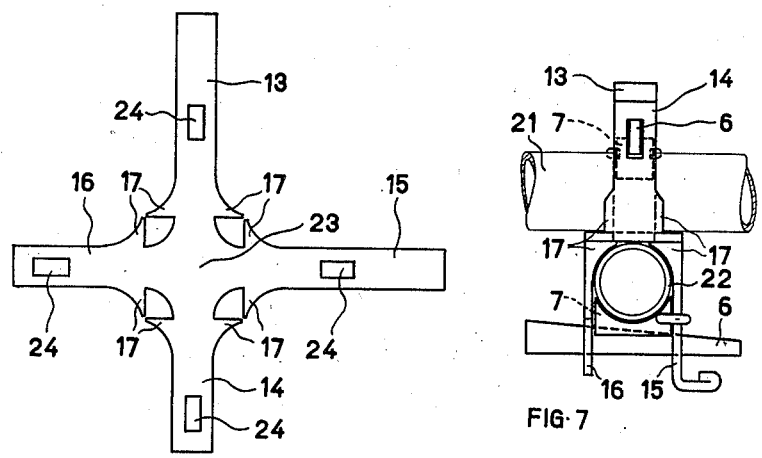
Fig. 6 illustrates a blank designed to be bent into shape to form a second modification of my pipe support, Fig. 7 being an elevation of this device as applied to a pair of pipes.

Referring to the drawings and first to Figs. 1 to 5, 2 and 3 are two semi-cylindrical saddle-shaped pipe rests extending at right angles and cast integral with each other, being united at 1. Each of the two parts 2 and 3 is formed with reinforcing ribs 4, the ribs extending from the bottom piece 1 common to the parts 2 and 3 upwardly and forming extensions with openings 5 for the passage of a wedge piece 6. 7 is a clamping piece inserted between the two extensions 4, such clamping piece being formed with a concave surface 20 which, together with the hollow cylindrical pipe rest forms a full hollow cylinder for the reception of a pipe such as 21, 22.

One of the reinforcing ribs 4 is formed with lateral indentures 11 and each clamping piece 7 is formed with hook-shaped arms 9, 10 projecting into the indentures 11, which thus form guides for the clamping pieces and prevent them from getting lost.

On their cylindrical face the clamping pieces 7 are formed with notches 12 and on their backs the clamping pieces are formed each with a longitudinal groove 8 designed to form a guide for the lower part of the wedge piece.

Figs. 1 and 2 show the pipes 21, 22 crossing each other at right angles and the connecting piece according to this invention applied to the pipes at their crossing point. The clamping pieces 7 are pressed down onto the pipes by the wedge pieces 6. Obviously the connecting piece here shown can easily be placed in position on the pipes and fixed in this position by means of the wedge pieces 6 and clamping pieces 7 and it can be disengaged from the pipes with equal readiness.

The clamping pieces are preferably formed with their arms 9, 10 diverging somewhat to allow the parts 10 to enter the indentures 11 of one of the ribs 4, the arms being thereafter bent inwardly by applying pressure thereon, whereby the clamping pieces are prevented from dropping out.

The connecting piece illustrated in Figs. 1 to 5, as here above described, may be made of cast iron or of some other siutable metal such as copper, brass or the like.

Two further modifications, which may for instance be made of rolled metal such as sheet iron, are illustrated in Figs. 6 to 9.

The modification illustrated in Figs. 6 and 7 is formed with a centre piece 23 having the configuration of a cross, and arms 13, 14, 15, 16 extend from the four arms of the centre piece. The adjoining arms 14 and 16 are shorter than the other two arms 13 and 15. All the arms are formed with apertures 24 for the passage of wedge pieces and lateral extensions 17 of triangular contour extend on both sides from the inner ends of the arms.

As shown in Fig. 7, the blank shown in Fig. 6 is bent into shape by bending the arms 15 and 16 downwardly so that they extend at right angles to the centre piece 23. The arms 13, 14 are bent upwardly also at right angles to the centre piece. The triangular extensions 17 of the arms 13 and 14 are bent inwardly, the lines of bending being the extensions of the side edges of the arms, so that the four extensions 17 of the arms 13 and 14 will support the pipe 21 on their slightly curved outer edges.

In a similar manner the lateral extensions 17 of the arms 15 and 16 are bent inwardly to form rests for the pipe 22. The pipes are held in position between a pair of arms and on the extensions 17 by means of wedge pieces 6 and clamping pieces 7.

Figures 8, 9:
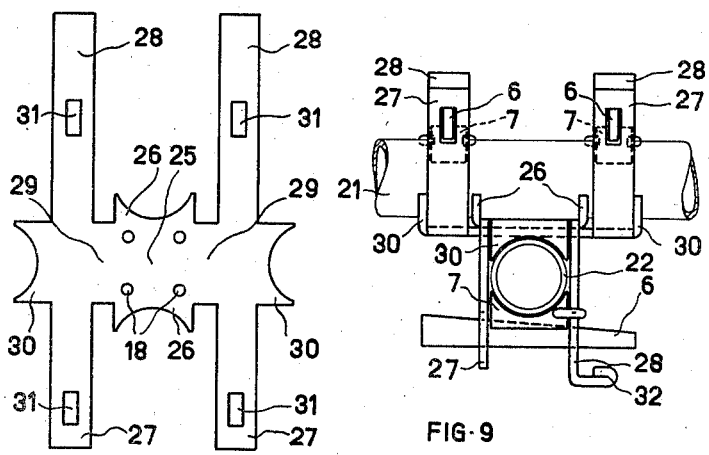
Figs. 8 and 9 are similar views of a third modification.

The third modification illustrated in Figs. 8 and 9 also shows a centre piece 25, however, here the rests 26 for one of the pipes extend from the longitudinal edges of the centre piece. A pair of short arms 27 and another pair of long arms 28 extend at rght angles to the centre piece 25, being connected with it by connecting pieces 29. Pipe rests 30 are formed between the arms 27 and 28.

Fig. 9 shows two blanks of the kind illustrated in Fig. 8 in superposition at right angles to each other, the two parts being held together by means of rivets (not shown) extending through holes 18. In the blank shown in Fig. 8 the arms 27 and 28 are bent upwardly at right angles to the centre piece 25 and so are their extensions 30. The pipe 21 rests on these extensions and is held down thereon by wedge pieces 6 extending through apertures 31 formed in the arms.

A similar centre piece with arms extending therefrom holds the pipe 22 in position.

The outer ends of the longer arms 28 of each piece are shown as being doubled up at 32 to prevent the clamping pieces 7 from slipping off.

I wish it to be understood that I do not desire to be limited to the exact details of construction shown and described for obvious modifications will occur to a person skilled in the art.

I claim:

1. A pipe support comprising in combination two saddle-shaped pipe rests extending in opposite directions with their backs fixed to each other, a pair of arms extending from each of these rests, a clamping piece with a concave inner surface arranged between the arms of each pair and wedges extending through openings near the ends of said arms to force said clamping pieces down on the pipes supported in said rests, both saddle-shaped pieces being formed of a single stamped sheet metal blank having the form of a cross, the arms of which are bent at right angles to the centre piece, segment-shaped extensions on said centre piece forming rests for the pipes.

2. A pipe support comprising in combination two saddle-shaped pipe rests extending in opposite directions with their backs fixed to each other, a pair of arms extending from each of these rests, a clamping piece with a concave inner surface arranged between the arms of each pair and wedges extending through openings near the ends of said arms to force said clamping pieces down on the pipes supported in said rests, both saddle-shaped pieces being formed of a single stamped sheet metal blank having the form of a cross, the arms of which are bent at right angles to the centre piece, one arm being longer than the other and doubled-up at the end.

3. A pipe support comprising in combination two saddle-shaped pipe rests extending in opposite directions with their backs fixed to each other, a pair of arms extending from each of these rests, a clamping piece with a concave inner surface arranged between the arms of each pair and with a groove forming a guide for a wedge and wedges extending through openings near the ends of said arms to force said clamping pieces down on the pipes supported in said rests.

4. A pipe support comprising in combination two saddle-shaped pipe rests extending in opposite directions with their backs fixed to each other, a pair of arms extending from each of these rests, a clamping piece with a concave inner surface arranged between the arms of each pair and wedges extending through openings near the ends of said arms to force said clamping pieces down on the pipes supported in said rests, hook-shaped arms being provided on each clamping piece and indentations in one of the arms of each saddle-shaped piece, into which project said hook-shaped arms.

5. A pipe support comprising in combination two saddle-shaped pipe rests extending in opposite directions with their backs fixed to each other, a pair of arms extending from each of these rests, a clamping piece with a concave inner surface arranged between the arms of each pair and wedges extending through openings near the ends of said arms to force said clamping pieces down on the pipes supported in said rests, both saddle-shaped pieces being formed of a single stamped sheet metal blank having the form of a cross, the arms of which are bent at right angles to the centre piece, segment-shaped extensions on said centre piece forming rests for the pipes.

6. A pipe support comprising in combination two saddle-shaped pipe rests extending in opposite directions with their backs fixed to each other, a pair of arms extending from each of these rests, a clamping piece with a concave inner surface arranged between the arms of each pair and wedges extending through openings near the ends of said arms to force said clamping pieces down on the pipes supported in said rests, both saddle-shaped pieces being formed of a single stamped sheet metal blank having the form of a cross, the arms of which are bent at right angles to the centre piece, one arm being longer than the other and doubled-up at the end.

JOHAN FRIEDRICH KÖHNKE.